United States Patent [19]

Yamauchi et al.

[11] 4,181,944
[45] Jan. 1, 1980

[54] APPARATUS FOR ENGINE CONTROL

[75] Inventors: Teruo Yamauchi; Yoshishige Oyama, both of Katsuta; Nobuaki Miyakawa, Hitachi, all of Japan

[73] Assignee: Hitachi, Ltd., Japan

[21] Appl. No.: 924,819

[22] Filed: Jul. 14, 1978

[30] Foreign Application Priority Data

Jul. 15, 1977 [JP] Japan .................................. 52/84096

[51] Int. Cl.² .......................... G06F 15/20; F02D 5/00
[52] U.S. Cl. .................................... 364/431; 364/571; 123/32 EA
[58] Field of Search .................. 364/431, 112, 571; 123/32 EA, 148 E, 32 EB, 32 ED, 32 AE, 32 EE, 119 A

[56] References Cited

U.S. PATENT DOCUMENTS

| | | | |
|---|---|---|---|
| 3,846,760 | 11/1974 | Ironside | 364/431 X |
| 3,906,205 | 9/1975 | Yoshida et al. | 364/431 X |
| 3,906,437 | 9/1975 | Brandwein et al. | 364/431 X |
| 3,909,601 | 9/1975 | Yamawaki et al. | 364/431 X |
| 3,916,170 | 10/1975 | Norimatsu et al. | 364/431 |
| 4,107,717 | 8/1978 | Klotzner et al. | 364/431 |
| 4,116,052 | 9/1978 | Paluka | 364/431 X |
| 4,130,863 | 12/1978 | Schweitzer et al. | 364/431 X |

Primary Examiner—Edward J. Wise
Attorney, Agent, or Firm—Craig and Antonelli

[57] ABSTRACT

An apparatus for the optimum control of a combustion engine, which is capable of compensating for the change in the combustion engine with time caused by mechanical wear. An optimum control value is stored in a memory. The data stored in the memory is compared in a microcomputer with an output from at least one sensor for detecting the operating conditions of the combustion engine, so that the optimum control signal for the present operating conditions is applied to the control apparatus for the combustion engine. In response to an output from a combustion pressure sensor for detecting the change with time of the combustion engine, calculations for correcting the data in the memory are conducted, followed by the updating of the data therein.

14 Claims, 7 Drawing Figures

APPARATUS FOR ENGINE CONTROL

BACKGROUND OF THE INVENTION

1. Field of the Invention

This invention relates to an apparatus for the control of a combustion engine, or more in particular to an apparatus for engine control whereby the air-fuel ratio, the timing of spark and the exhaust gas reciprocating (EGR) rate of a reciprocating, fuel-injected, spark ignition internal combustion engine are always maintained optimum in accordance with the engine operating conditions.

2. Description of the Prior Art

What is called "the optimum control type" of engine control apparatus for a combustion engine is well known. An apparatus for engine control employing such a system is disclosed in U.S. Pat. No. 3,969,614. The apparatus for engine control disclosed in U.S. Pat. No. 3,969,614 is such that, in order to control the fuel injection, EGR and the timing or spark, at least one engine operating condition is measured by a sensor. On the basis of this measurement, an optimum control value is determined by a digital computer, which value is used for controlling the fuel injection, EGR and timing of spark.

The other relevant prior art includes Japanese Pat. Appln. Kokai (Laid-Open) No. 4903/72 entitled "Automatic Electronic Regulator of Ignition Advance of Otto Engine". In this conventional apparatus, the timing of spark of the combustion engine is controlled most suitably on the basis of the measurements taken by a combustion pressure sensor and a crank angle sensor.

The above-mentioned and other conventional apparatuses are not concerned with engine control compensating for the charge with time of the combustion engine condition.

SUMMARY OF THE INVENTION

Accordingly, it is an object of the present invention to provide an apparatus for engine control which is capable of compensating for the change with time of the combustion engine conditions.

Another object of the invention is to provide an apparatus for engine control which is capable of compensating for the change in fuel conditions.

Still another object of the invention is to provide an apparatus for engine control which is capable of compensating for the change in the combustion engine conditions with time at low cost.

According to the present invention, there is provided an apparatus for combustion engine control, in which the latest data on the combustion engine conditions are collected and compared with the stored data, the stored data is corrected if the combustion engine is deteriorated or changed, and the factors affecting the fuel combustion in the combustion engine such as the air-fuel ratio, timing of spark and EGR rate are regulated on the basis of the newly stored data.

DETAILED DESCRIPTION OF THE PREFERRED EMBODIMENTS

Figure 1:
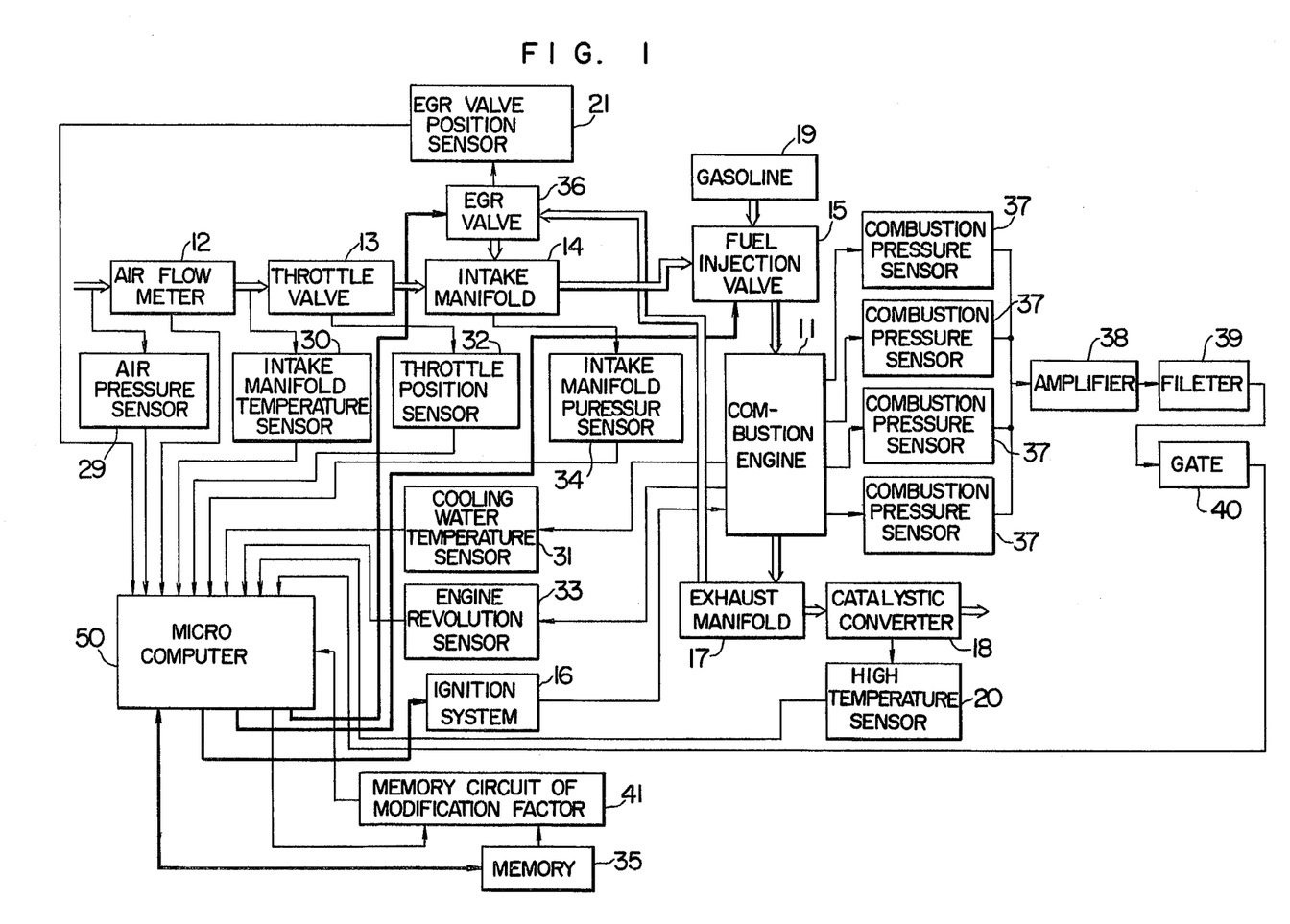
FIG. 1 is a block diagram showing an engine control system for a throttled, reciprocating, fuel-injected, spark-ignition internal combustion engine.

A block diagram of an embodiment of the present invention is shown in FIG. 1.

The air to be taken into a combustion engine 11 is measured by an air flow meter 12, passed through a throttle valve 13, through an intake manifold 14, and mixed with the gasoline 19 sprayed from a fuel injection valve 15. The mixture gas is ignited and burnt by an ignition system 16 in the combustion chambers (not shown) of the engine 11, passed through the exhaust manifold 17, and with the non-purified gas purified by a catalytic converter 18, discharged into atmosphere. General processes for control of the air-fuel ratio, timing of spark and EGR affecting the combustion efficiency of the combustion engine will be described below.

(1) Air-fuel ratio (Ratio by weight between sucked air and fuel flow rate)

The air-fuel ratio of the combustion engine 11 is controlled in such a manner that the detection values produced from the air pressure sensor 29, the intake manifold temperature sensor 30 and the combustion engine cooling water temperature sensor 31 for detecting the ambient conditions surrounding the combustion engine 11, and the detection values produced from the throttle position sensor 32, the engine revolutions sensor 33 and the intake manifold pressure sensor 34 for detecting the operating conditions of the combustion engine 11, are applied to the microcomputer 50. By the calculations in the microcomputer 50, the true air flow rate and fuel flow rate are determined and stored in the memory 35 by the microcomputer 50. The most suitable engine revolutions and intake manifold pressure at the time of supply of the true air flow and true fuel flow to the combustion engine 11 are retrieved from the memory 35 by the microcomputer 50. In order to attain the optimum air-fuel ratio associated with the retrieved engine revolutions and intake manifold pressure, the fuel injection valve 15 is regulated at the output section of the microcomputer 50 according to the control pattern of the operation time of the injection valve 15 stored in the microcomputer 50. When the temperature detected by the high temperature sensor 20 for the catalytic converter 18 increases, the microcomputer 50 increases the amount of fuel injection while reducing the amount of CO gas and NOx gas in the exhaust gas.

(2) EGR rate (Ratio between air taken in and exhaust gas)

EGR is defined as the recirculation of part of the gas in the exhaust manifold 17 and introduction thereof into the intake manifold 14 via the EGR valve 36 in order to purify the same. The EGR rate is obtained by operating the signals applied to the microcomputer 50 from the EGR valve position sensor 21 and the throttle position sensor 32. The EGR rate, like in the optimum control of the air-fuel ratio, is controlled by the control signal applied from the output section of the microcomputer 50 to the EGR valve 36 in such a manner as to attain the optimum EGR rate for given engine revolutions and intake manifold pressure.

(3) Timing of spark

By detecting the change in the revolutions of the combustion engine 11, a cylinder not in good running order is detected. Revolutions-change detectors include devices for detecting the rolling of the combustion engine or knocking in the combustion chambers and a device such as the intake manifold pressure sensor 34 for load detection. In FIG. 1, the combustion pressure sensors 37 are used as sensors for detecting a cylinder in bad running order. The output of each combustion pressure sensor 37 is amplified by the amplifier 38, and through the band-pass filter 39 for eliminating an operation error causing noises or like and the gate 40, to the microcomputer 50. In response to the input signal to the microcomputer 50 from the combustion pressure sensors 37, the microcomputer 50 applies from the output section thereof to the ignition system 16, an output signal coincident with the timing of spark stored in the memory 35, thereby controlling the ignition timing.

In the case where the temperature detected by the high temperature sensor 20 increases, the microcomputer 50 expedites the timing of spark, thus controlling the amount of NOx and CO gases in the exhaust gas at a predetermined purity.

The above-mentioned processes for controlling the air-fuel ratio, EGR rate and the timing of spark are well known. In these methods, the optimum control is impossible against the factors deteriorating the combustion engine such as the reduction in engine compression pressure caused by the wear of the cylinder or piston, or deterioration of the combustion engine parts with time.

According to the present invention, the disadvantages of the conventional control apparatuses mentioned above are obviated in such a manner that the degrees of changes in air-fuel ratio, EGR rate and timing of spark attributable to the deterioration or change with time of the combustion engine are determined, so that the patterns of the air-fuel ratio, EGR rate and the timing of spark are corrected in accordance with the deterioration of the combustion engine by the memory circuit of modification factor 41 shown in FIG. 1. In FIG. 1, the memory circuit of modification factor 41 is inserted between the microcomputer 50 and the memory 35, and a modification factor commensurate with the change or deterioration with time of the combustion engine 11 is applied to the output signal produced from the memory 35, thereby effecting optimum control of the combustion engine.

The signal detected by the combustion pressure sensors 37 mounted on the combustion engine 11 (an average maximum combustion pressure in the combustion chambers over a time period under a set operating condition) is compared in the microcomputer 50 with the signal representative of the maximum combustion pressure under the same operating condition which has thus far been stored in the memory 35. If the result of comparison exceeds a certain level of difference, it is judged that the combustion engine 11 is deteriorated, and a command for changing a modification factor is issued to the memory circuit of modification factor 41 from the microcomputer 50. The resulting modification factor is multiplied by selected one of the three control factors including air-fuel ratio, EGR rate and timing of spark retrieved from the memory 35. As a result, the control level of the air-fuel ratio, EGR rate or the timing of spark is altered and corrected. The modification factor is required for each of the air-fuel ratio, EGR rate and timing of spark, so that the factors $K_1$, $K_2$ and $K_3$ for the air-fuel ratio, EGR rate and the timing of spark respectively are required to be stored in advance in the memory circuit of modification factor 41. A single combustion pressure sensor 37 may be provided for each cylinder of the combustion engine 11 or to cover all the cylinders thereof.

Figure 2:
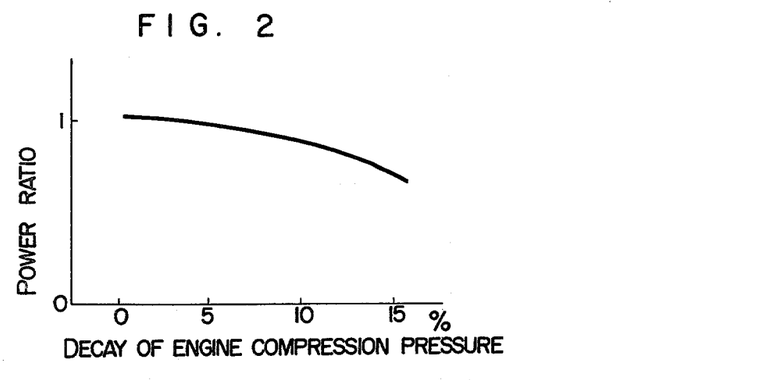
FIG. 2 is a graph showing the relation between the decay of engine compression pressure and power ratio.
Figure 3:
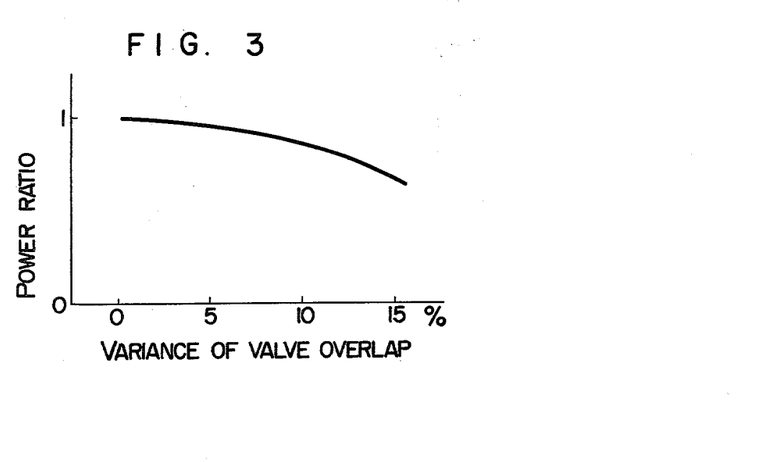
FIG. 3 is a graph showing the relation between the power ratio and the variance of valve overlap between intake valve and exhaust valve.
Figure 4:
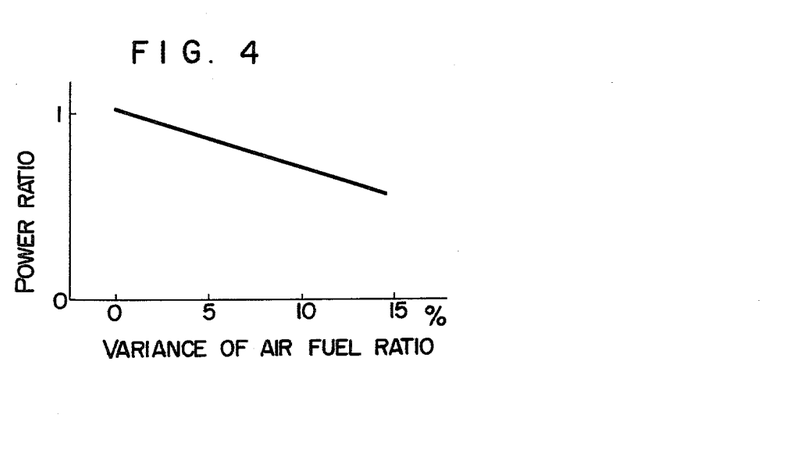
FIG. 4 is a graph showing the relation between the variance of air-fuel ratio and power ratio.

Examples of the changes in combustion engine with time are shown in FIGS. 2 to 4.

The graph of FIG. 2 shows the relation between the decay of engine compression pressure and power ratio. From this graph, it is seen that the increase in the residual gas in the pistons attributable to reduction in engine compression pressure which in turn is caused by the wear of the cylinders or pistons results in the reduction in output of the combustion engine.

The graph of FIG. 3 illustrates the relation between the power ratio and the increase in the variance of valve overlap of intake and exhaust valves due to wear. It is seen that the change with time in overlap of the intake and exhaust valves causes the increase in the amount of residual gas in the pistons, thus reducing the engine output.

The graph of FIG. 4 shows the effect that the change in the air-fuel ratio due to the change with time of the fuel supply system such as the throttle valve has on the power ratio.

The factors contributing to the output reduction of the combustion engine are determined substantially by the length of operating time of the combustion engine. The command for changing the modification factor, therefore, may be issued either from the microcomputer 50 or the vehicle odometer with equal effect. For instance, the odometer may be so constructed that a signal is produced at regular intervals of distance such as 3,000 km, which signal is applied to the memory circuit of modification factor 41, thus updating the value of the modification factor at regular intervals of distance covered. In the case where the modification factor is corrected with the deterioration of the combustion engine, the outputs of the engine revolutions sensor 33 may alternatively be accumulated to attain the same purpose.

As a sensor for detecting the change of the combustion engine with time, a detector for detecting the ion current flowing in the spark plug may be used instead of the combustion pressure sensor 37.

The other factors to be taken into consideration in determining the modification factor include operation timings of the intake valve and exhaust valve, wear or other deterioration with time of such parts as the fuel measuring system, fuel injection valve 15, air measuring system and metering components.

In the case of compensation for changes with time in FIGS. 2, 3 and 4, the modification factor may be less than unity or 1. In the compensation for the change with time of the spark timing, however, the modification factor is required to be progressively larger than unity with time.

Figure 5:
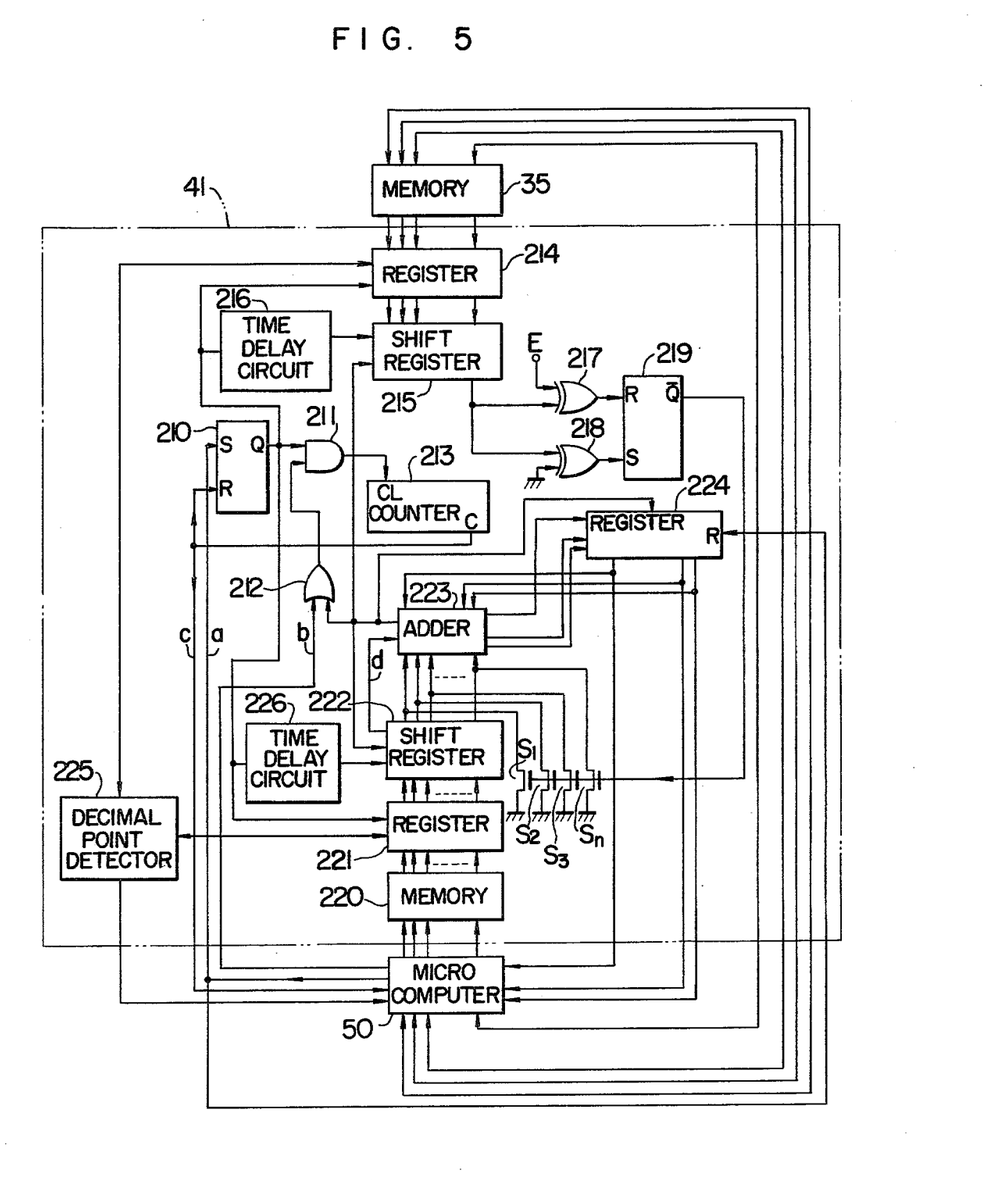
FIG. 5 is a schematic diagram showing a modification factor memory circuit shown in FIG. 1.

A schematic diagram of the memory circuit of modification circuit 41 is shown in FIG. 5. In the drawing under consideration, the microcomputer 50 and memory 35 are identical to those used in FIG. 1. Upon application of the modification factor change command start signal a to the terminal S of the flip-flop 210 from the microcomputer 50, the output terminal Q of the flip-flop 210 changes to "high" level. The flip-flop 210 is for storing the time required from the starting of calculation for correction of the modification factor to the completion thereof. After a sufficient length of time for the output terminal Q of the flip-flop 210 to change has passed from the application of the start signal a, the correction signal b is applied from the microcomputer 50 to the two-input OR gate 212. Since one of the input terminals of the two-input AND gate 211 is at "high" level, the signal that has passed the two-input OR gate 212 is applied to the clock signal input terminal CL of the counter 213. As long as the output terminal Q of the flip-flop 210 is at "high" level, all the output signals from the two-input OR gate are applied through the two-input AND gate 211 and counted by the counter 213. When the count in the counter 213 overflows and the carry-out signal C is produced, the flip-flop 210 is reset. At the same time, the carry-out signal C is applied as a correction calculation end signal to the microcomputer 50.

In the case of a brand new vehicle, settings of the above-mentioned three control factors for the combustion engine carried in the vehicle are stored in the memory 35, from which the data on the three control factors are read out in response to an address signal produced from the microcomputer 50. The register 221 is so constructed that the data input terminal thereof is connected to the data output terminal of the memory 35, while the latch signal input terminal thereof is connected to the output terminal Q of the flip-flop 210. The shift register 215 has the data input terminal thereof connected to the data output terminal of the register 214 and the clock signal input terminal thereof to the other input terminal of the two-input OR gate 212. Upon start of the shifting of data input to the shift register 215, "0" is input in turn to the same from the most significant bit. The time delay circuit 216 is connected to the output terminal Q of the flip-flop 210 for applying the output thereof to the shift register 215.

The operation of the circuit configuration including the components ranging from the memory 35 to the shift register 215 will be described below.

In response to the output signal of the microcomputer 50, the output data of the memory 35 is selected. This selected data is applied to the register 214, and it is held when the output Q of the flip-flop 210 becomes "high". The shift register 215, each time of application thereto of a clock pulse described later, shifts the data therein towards less significant bit, thus applying "0" to the more significant bits each time of shifting.

The exclusive OR gate 217 has one input terminal thereof connected to the anode terminal E of the power supply and the other input terminal thereof to the least significant bit of the shift register 215. The exclusive OR gate 218 has one input terminal thereof connected to the least significant bit of the output data of the shift register 215 and the other input terminal grounded. The flip-flop 219 has the reset signal input terminal R thereof connected to the output terminal of the exclusive OR gate 217. When the least significant bit of the output of the shift register 215 is "0" in this configuration, the flip-flop 219 is reset, while when the least significant bit of the output of the shift register 215 is "1", the flip-flop 219 is set. In other words, the circuit configuration including the exclusive OR gates 217 and 218 and the flip-flop 219 is capable of judging whether the output data of the shift register 215 is "1" or "0".

The memory 220 is for storing the modification factor. The register 221 has the data input terminal thereof connected to the data output terminal of the memory 220 and the latch signal input terminal thereof to the output terminal Q of the flip-flop 210. The shift register 222 has the data input terminal thereof connected to the data output terminal of the register 221 and the clock signal input terminal thereof to the other input terminal of the two-input OR gate 212. The adder 223 has one input terminal thereof connected to the data output terminal of the shift register 222 and a calculation end signal output terminal thereof to the other input terminal of the two-input OR gate 212. The register 224 has the reset signal input terminal R thereof connected to the set terminal S of the flip-flop 210, the data input terminal thereof to the data output terminal of the adder 223, the data output terminal thereof to the other data input terminal of the adder 223, and the data collection signal input terminal thereof to the calculation end signal output terminal of the adder 223. The decimal point detector 225 is for detecting the position of the decimal point of the accumulation of the values applied to the registers 214 and 221 and for transmitting to the microcomputer 50 the position of the decimal point of the value thus calculated. The switches $S_1$ to $S_n$ are connected to the n-bit data output terminals numbering n, of the shift register 222, which may take the form of, say, MOS-FET switches as shown in FIG. 5. The switch $S_1$ has the drain terminal thereof connected to the output terminal of the most significant bit of the shift register, the source terminal thereof grounded, and the gate terminal thereof connected to the output terminal $\overline{Q}$ of the flip-flop 219. The other switches up to switch $S_n$ are also connected in similar fashion.

The operation of the circuit including the memory up to the switch $S_n$ is described below.

In response to the address output signal of the microcomputer 50, the modification factor of the memory 220 is read out. When the output at the terminal Q of the flip-flop becomes "high" in level by the start signal a of the microcomputer 50, the modification factor designated by the address output is held in the register 221. The data applied to the shift register 221, after the lapse of the time required for establishment of the applied data (which is equal to the delay time of the time delay circuit 226), is applied to the shift register 222. With the establishment of the output data of the shift register 222, the calculation start command signal d is applied from the shift register 222 to the adder 223. When the least significant bit of the shift register 215 is at "1" level, the output data of the shift register 215 is added to the output data of the register 224 by the adder 223. When the least significant bit of the shift register 215 is at "0" level, on the other hand, the output $\overline{Q}$ of the flip-flop 219 becomes "high" and therefore the input data applied from the shift register 222 to the adder 223 is turned to the grounded level "0" by the MOS-FET switches $S_1$ to $S_n$. As a result, the adder 223 adds the data in the register 224 to all the "0" level signals of the input data from the register 222. Each time the adding calculation is completed, the adder 223 transmits the calculation result to the register 224 while at the same time producing a calculation end signal. This calculation end signal holds the data in the register 214 and, passing through the two-input AND gate 211, is counted as the number of calculations by the counter 213. Further, since this calculation end signal is the clock signal for the shift registers 215 and 222, the calculation end signal shifts the data in the shift registers 215 and 222.

When the calculations in the same number as the bits of the value applied to the shift register 215 are completed, the carry-out signal is produced from the counter 213 and the flip-flop 210 is reset, while at the same time applying a correction calculation end signal c to the microcomputer 50. Upon receipt of the correction calculation end signal c, the microcomputer 50 takes in the data stored in the register 224. The value taken in constitutes the result of multiplication of the data in the registers 214 and 221.

An example of calculation by the memory circuit of modification factor 41 is shown below.

Assume that the air-fuel ratio is 14.6875 and the modification factor 0.906. The numeral 14.6875 is read out of the memory 35 and held by the register 214. The modification factor 0.906 is read out of the memory 220 and held by the register 221.

After the lapse of a delay time set by the time delay circuit 226 or 216 following the production of the start signal from the microcomputer 50, the flip-flop 219 identifies the least significant bit of the shift register, so that the data in the shift register 223 and the register 224 are added in the adder 223. When the correction signal b is applied to the two-input AND gate 211 after application of the start signal a to the flip-flop 210, the counter 213 begins to count. Subsequently, the least significant bit is identified the number of times equal to the bits set in the register 215. Each time of such identification, the data in the shift register 222 and register 224 are added in the adder 223.

In binary digits, the air-fuel ratio of 14.6875 is 1110.10110, and the modification factor of 0.906 is 0.11101. In the calculation (1110.10110)×(0.11101) explained below, the unnecessary "0" and decimal points are omitted.

Before start of calculation, the data in the shift register 215 is (111010110). When the shift register 222 produces an output signal, the least significant bit of the shift register 215 is 0 and therefore the (000000) is applied to one input terminal of the adder 223. At the time of start of calculation, the data in the register 224 is reset to (000000) which is applied to the other input terminal of the adder 223. When the adder 223 ends the adding operation in response to the above-mentioned input, the result of calculation is transferred to the register 224, thus producing the calculation end signal shown in FIG. 1. As a result, the data in the shift register 215 is shifted to (011101011). In view of the fact that the least significant bit of the register 215 is "1" due to the output signal of the shift register 222, the data (011101) in the shift register 222 is shifted to the adder 223, with the result that (000000) and (011101) are added to each other in the adder 223 in response to the output signal of the register 224. In the meantime, the adder 223 produces the second calculation end signal. Similar operations are repeated, so that all the calculations are completed with the production of the ninth calculation end signal corresponding to the number of bits in (111010110). Upon completion of the ninth calculating operation, the carry-out signal is produced from the counter 213 and the flip-flop 210 is reset. At the same time, the correction calculation end signal c is applied to the microcomputer 50, which thereby takes in the data (11010100111110) from the register 224. In response to the signal from the decimal point detector 225, the calculation result (1101.0100111110) updates the data in the memory 35 through the microcomputer 50. In this case, the memory 35 is a non-volatile electronic alternative ROM (EA ROM) capable of being electrically updated.

An embodiment in which a command for changing the modification factor is issued by the combustion pressure sensor 37 will be described below.

Figure 6:
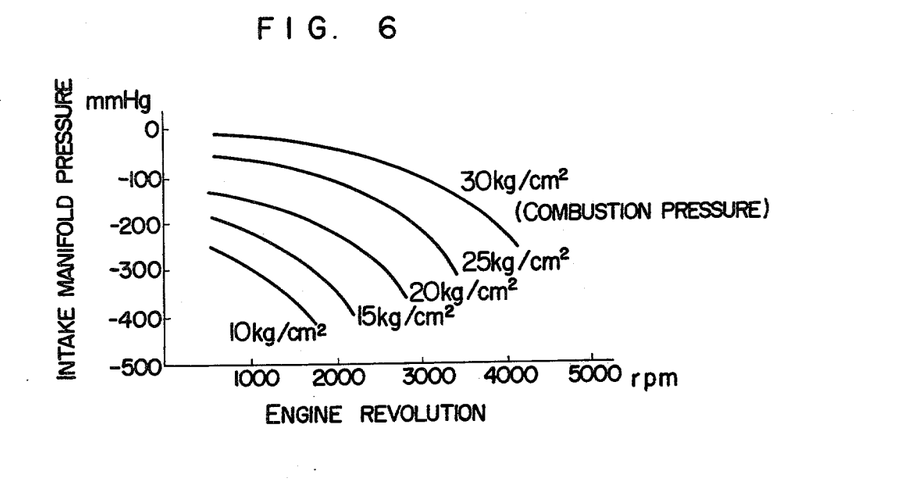
FIG. 6 is a graph showing the relation between the intake manifold pressure and the engine revolutions with the combustion pressure used as a parameter.
Figure 7:
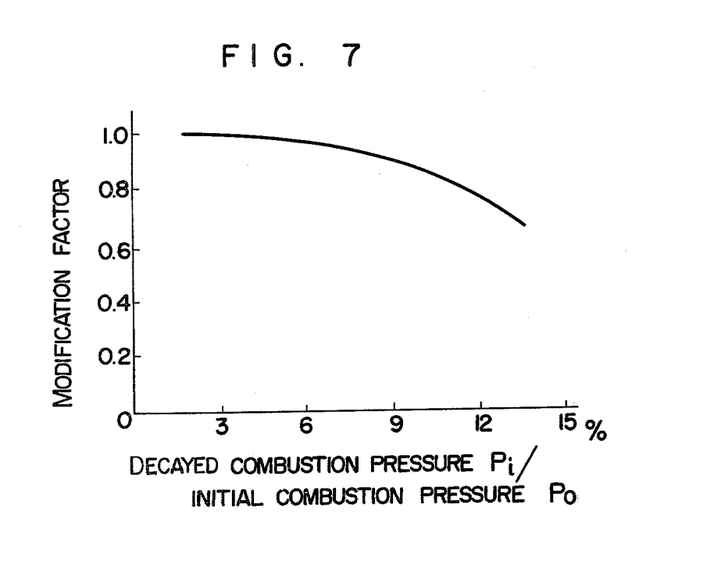
FIG. 7 is a graph showing the relation between the combustion pressure ratio Pi/Po (where Pi is the decayed combustion pressure and Po the initial combustion pressure) and the modification factor.

The graph of FIG. 6 shows the relation between engine revolutions and the intake manifold pressure with the combustion pressure as a parameter for a brand new 1600 cc 4-cycle 4-cylinder combustion engine. This characteristic is stored in the memory 35 in the form of engine revolutions and intake manifold pressure. The combustion state of the combustion engine is detected by the combustion pressure sensors 37, so that the detected pressure is compared with the combustion pressure under the same operating conditions associated with a simulated combustion pressure pattern. When the ratio between the simulated combustion pressure, i.e., initial combustion pressure Po and the detected combustion pressure, i.e., decayed combustion pressure Pi is lower than a predetermined value, a modification factor change command is issued from the microcomputer 50 to the memory circuit of modification factor 41, thus updating the data in the memory 35. The modification factor relative to the above-mentioned ratio of combustion pressure is written in the memory 220 of the memory circuit of modification factor 41. When the ratio Po/Pi is reduced below a certain value, the modification factor gradually changes as shown in FIG. 7. The modification factor relative to the Po/Pi is multiplied by the data in the memory 35, thus updating the data stored in the memory 35. On the basis of this updated data, the combustion engine is controlled most properly.

In the case where EA ROM is used as the memory 35, the calculation by the memory is more conveniently performed by changing the modification factor associated with the ratio $P_{i2}/P_{i1}$, where $P_{i1}$ is the combustion pressure previously measured after the coverage of, say, 3,000 km, and $P_{i2}$ the combustion pressure recently measured after the coverage of, say, 6,000 km, than by changing the modification factor associated with the time when the ratio $P_o/P_i$ is reduced below a certain value.

The memory 35 used in this invention is not limited to EA ROM but may take the form of an ordinary ROM in common use. In such a case, the data in the ROM is fixed and therefore either an ROM storing settings of the three control values for the brand new vehicle are used continuously, or it is replaced by another ROM storing settings different from those for the brand new vehicle at regular intervals of distance coverage of 3,000 km, for example. In the latter case, the signal taken into the microcomputer 50 from the register 224 is used as a new setting.

The above-mentioned embodiments subject the combustion engine to optimum control on the basis of the detected value of the combustion pressure, and therefore are adaptable for changes in fuel properties and ambient conditions. Further, the present invention has the advantage that the changes with time of the engine conditions are compensated for at low cost merely by providing the memory circuit of modification factor 41.

In order to apply the characteristics of FIG. 7 to the control of air-fuel ratio, EGR rate and the timing of spark, it is sufficient if the results of multiplication of the previously-obtained coefficients $K_1$, $K_2$, and $K_3$ by the values represented by the characteristics diagram of FIG. 7 are stored in the memory 220 in advance.

According to the invention, as mentioned above, the optimum control of the combustion engine is capable of being accomplished merely by use of the combustion pressure sensor 37 or other sensor for detecting the change with time of the combustion engine condition. As shown in FIG. 1, however, the first sensor for detecting the operating conditions of the combustion engine is not limited to one type. Further, the second sensor for detecting the ambient conditions surrounding the combustion engine may be used at the same time. Furthermore, the control of the EGR rate among the three control factors including the air-fuel ratio, EGR rate and timing of spark may be replaced by the control of exhaust gas.

We claim:

1. In an apparatus for the control of a combustion engine with a control device for controlling the process of converting the heat energy generated by fuel combustion into mechanical energy, the apparatus comprising a first sensor for detecting the operating conditions of said combustion engine operated for energy conversion, said first sensor converting said detected value into an electrical signal and producing said electrical signal; a memory storing a setting for controlling said control device and having the stored data capable of being updated in response to an input signal thereto; and a microcomputer for retrieving the setting for controlling said control device, from said first sensor and said memory, comparing the detected value of said first sensor with the setting for controlling said control device, calculating a setting for the optimum control of said control device in accordance with the operating condition of the combustion engine, and applying the result of said calculation to said control device; the improvement further comprising;

(a) a sensor for detecting the change with time of the combustion engine; and
(b) a modification factor memory circuit for determining the ratio between a previously detected value of said sensor for detecting the change with time of the combustion engine and the presently detected value thereof, said memory circuit calculating a modification factor associated with said ratio from a function determined in advance, said memory circuit applying to said memory the calculated value of said modification factor and data in said memory as a new setting.

2. In an apparatus for the control of a combustion engine with a control device for controlling the process of converting the heat energy generated by fuel combustion into mechanical energy, the apparatus comprising a first sensor for detecting the operating conditions of said combustion engine operated for energy conversion, said first sensor converting said detected value into an electrical signal and producing said electrical signal; a second sensor for detecting the ambient conditions of the combustion engine operated for energy conversion, said second sensor converting the detected value into an electrical signal and producing said signal; a memory storing a setting for controlling said control device and having the stored value capable of being updated in response to an input signal thereto; and a microcomputer for retrieving the detected value of said first sensor, the detected value of said second sensor and the setting for controlling said control device, from said first sensor, said second sensor and said memory, said microcomputer comparing said detected value of said first sensor corrected by said detected value of said second sensor, with the setting for controlling said control device, said microcomputer calculating a setting for optimum control of said control device in accordance with the operating conditions of said combustion engine and applying the result of said calculation to said control device; the improvement further comprising:

(a) a sensor for detecting the change with time of the combustion engine; and
(b) a modification factor memory circuit for determining the ratio between a previously detected value of said sensor for detecting the change with time of the combustion engine and the presently detected value thereof, said memory circuit calculating a modification factor associated with said ratio from a function determined in advance, said memory circuit applying to said memory the calculated value of said modification factor and data in said memory as a new setting.

3. In an apparatus for the control of a combustion engine with a control device including a fuel injection valve for regulating the fuel supply rate for the purpose of controlling the process of converting the heat energy generated by fuel combustion into mechanical energy, and an ignition system for controlling the ignition timing of a fuel-air mixture gas, said apparatus comprising a first sensor for detecting the operating conditions of said combustion engine operated for energe conversion, said first sensor converting said detected value into an electrical signal and producing said electrical signal; a memory storing a setting for controlling said control device and having the stored data capable of being updated in response to an input signal thereto; and a microcomputer for retrieving the setting for controlling said control device, from said first sensor and said memory, comparing the detected value of said first sensor with the setting for controlling said control device, calculating a setting for the optimum control of said control device in accordance with the operating condition of the combustion engine, and applying the result of said calculation to said control device; the improvement further comprising:

(a) a sensor for detecting the change with time of the combustion engine, and (b) a modification factory memory circuit for determining the ratio between a previously detected value of said sensor for detecting the change with time of the combustion engine and the presently detected value thereof on the basis of the values detected by said sensor, said memory circuit calculating a modification factor associated with said ratio from a function determined in advance, said memory circuit applying to said memory the calculated value of said modification factor and data in said memory as a new setting, said memory updating the data therein to a new setting in response to a correction input signal applied thereto from said modification factor memory circuit, said microcomputer controlling said fuel injection valve and said ignition system in accordance with said new setting of said memory.

4. In an apparatus for the control of a combustion engine with a control device including a fuel injection valve for regulating the fuel supply rate for the purpose of controlling the process of converting the heat energy generated by fuel combustion into mechanical energy, and an ignition system for controlling the ignition timing of a fuel-air mixture gas, said apparatus comprising a first sensor for detecting the operating conditions of said combustion engine operated for energy conversion, said first sensor converting said detected value into an electrical signal and producing said electrical signal; a second sensor for detecting the ambient conditions of the combustion engine operated for energy conversion, said second sensor converting the detected value into an electrical signal and producing said signal; a memory storing a setting for controlling said control device and having the stored value capable of being updated in response to an input signal thereto; and a microcomputer for retrieving the detected value of said first sensor, the detected value of said second sensor and the setting for controlling said control device, from said first sensor, said second sensor and said memory, said microcomputer comparing said detected value of said first sensor corrected by said detected value of said second sensor, with the setting for controlling said control device, said microcomputer calculating a setting for optimum control of said control device in accordance with the operating conditions of said combustion engine and applying the result of said calculation to said control device; the improvement further comprising;

(a) a sensor for detecting the change with time of the combustion engine; and (b) a modification factor memory circuit for determining the ratio between a previously detected value of said sensor for detecting the change with time of the combustion engine and the presently detected value thereof on the basis of the values detected by said sensor, said memory circuit calculating a modification factor associated with said ratio from a function determined in advance, said memory circuit applying to said memory the calculated value of said modification factor and data in said memory as a new setting, said memory updating the data therein to a new setting in response to a correction input signal applied thereto from said modification factor memory circuit, said microcomputer controlling said fuel injection valve and said ignition system in accordance with said new setting of said memory.

5. In an apparatus for the control of a combustion engine with a control device including a fuel injection valve for controlling the fuel supply rate for the purpose of controlling the process of converting the heat energy generated by fuel combustion into mechanical energy, an ignition system for controlling the ignition timing of a fuel-air mixture gas, and an exhaust gas recirculation valve for controlling the recirculation of part of the exhaust gas generated by fuel combustion, said apparatus comprising a first sensor for detecting the operating conditions of the combustion engine operated for energy conversion, said first sensor converting the detected value into an electrical signal and producing the same; a second sensor for detecting the position of the exhaust gas recirculating valve of the combustion engine operated for energy conversion; a memory for storing a setting for controlling said control device, said setting being capable of being updated in response to an input signal to said memory; and a microcomputer for retrieving the value detected by said first sensor, the value detected by said second sensor and the setting for controlling said control device, from said first sensor, said second sensor and said memory, said microcomputer comparing said value detected by said first sensor with the setting for controlling said fuel injection valve, thereby calculating a setting for optimum control of said fuel injection valve, said microcomputer comparing the value detected by said first sensor with the setting for controlling said ignition system, thereby calculating a setting for optimum control of said ignition system, said microcomputer comparing the value detected by said second sensor and corrected on the basis of the value detected by said first sensor, with the setting for controlling said exhaust recirculation valve, thereby calculating a setting for optimum control of said exhaust recirculation valve, the results of said calculations being applied to said control device; the improvement further comprising:

(a) a sensor for detecting the change with time of the combustion engine; and (b) a modification factor memory circuit for determining the ratio between a previously detected value of said sensor for detecting the change with time of the combustion engine and the presently detected value thereof on the basis of the values detected by said sensor, said memory circuit calculating a modification factor associated with said ratio from a function determined in advance, said memory circuit applying to said memory the calculated value of said modification factor and data in said memory as a new setting, said memory updating the data therein to a new setting in response to a correction input signal applied thereto from said modification factor memory circuit, said microcomputer controlling said fuel injection valve, said ignition system and said exhaust gas recirculating valve.

6. An apparatus for the control of a combustion engine with a control device including a fuel injection valve for controlling the fuel supply rate for the purpose of controlling the process of converting the heat energy generated by fuel combustion into mechanical energy, an ignition system for controlling the ignition timing of a fuel-air mixture gas, and an exhaust gas recirculation valve for controlling the recirculation of part of the exhaust gas generated by fuel combustion, said apparatus comprising a first sensor for detecting the operating conditions of the combustion engine operated for energy conversion, said detected value being converted into an electrical signal and produced from said first sensor; a second sensor for detecting the ambient conditions of the combustion engine operated for energy conversion, said detected value being converted into an electrical signal and produced from said second sensor; a third sensor for detecting the position of said exhaust gas recirculation valve of the combustion engine operated for energy conversion; a memory for storing a setting for controlling said control device, said setting being capable of being updated in response to an input signal to said memory; and a microcomputer for retrieving the value detected by said first sensor, the value detected by said second sensor, the value detected by said third sensor and the setting for controlling said control device, from said first sensor, said second sensor, said third sensor and said memory, said microcomputer comparing the value detected by said first sensor and corrected on the basis of the value detected by said second sensor, with the setting for controlling said fuel injection valve, thereby calculating a setting for optimum control of said fuel injection valve, said microcomputer comparing the value detected by said first sensor and corrected on the basis of the value detected by said second sensor, with the setting for controlling said ignition system, thereby calculating a set value for optimum control of said ignition system, said microcomputer comparing the value detected by said third sensor and corrected on the basis of the values detected by said first and second sensors, with the setting for controlling said exhaust recirculation valve, thereby calculating a setting for optimum control of said exhaust recirculation valve, the results of said calculations being applied to said control device; the improvement further comprising:

(a) a sensor for detecting the change with time of the combustion engine; and (b) a modification factor memory circuit for determining the ratio between a previously detected value of said sensor for detecting the change with time of the combustion engine and the presently detected value thereof on the basis of the value detected by said sensor, said memory circuit calculating a modification factor associated with said ratio from a function determined in advance, said memory circuit applying to said memory the calculated value of said modification factor and data in said memory as a new setting, said memory updating the data therein to a new setting in response to a correction input signal applied thereto from said modification factor memory circuit, said microcomputer controlling said fuel injection valve, said ignition system and said exhaust gas recirculation valve.

7. An apparatus for the control of a combustion engine according to claim 1, 2, 3, 4, 5 or 6, in which said sensor for detecting the change with time of said combustion engine includes a sensor for detecting the combustion pressure of said combustion engine.

8. An apparatus for the control of a combustion engine according to claim 1, 2, 3, 4, 5 or 6, in which said combustion engine is of spark-ingition type having a spark plug, and said sensor for detecting the change with time of said combustion engine is an ion current detector for detecting an ion current flowing to said spark plug.

9. An apparatus for the control of a combustion engine according to claim 1, 2, 3, 4, 5 or 6, in which said sensor for detecting the change with time of said combustion engine includes an engine revolutions sensor, and said ratio between a previously detected value of said sensor and the presently detected value is based on accumulated values detected by said engine revolutions sensor.

10. An apparatus for the control of a combustion engine according to claim 1, 2, 3, 4, 5 or 6, in which said sensor for detecting the change with time of the combustion engine includes an odometer of a vehicle carrying said combustion engine, and said ratio between a previously detected value of said sensor and the presently detected value thereof is based on accumulated values detected by said odometer.

11. An apparatus for the control of a combustion engine according to claim 3, 4, 5 or 6, in which said combustion engine includes a catalystic converter for purifying the exhaust gas and a high temperature sensor for detecting the temperature of said converter, said microcomputer making calculations for correction of the setting for controlling said fuel injection valve and said ignition system, in response to the output of said high temperature sensor.

12. In an apparatus for the control of a combustion engine comprising a system including an air flow meter, a throttle valve, an intake manifold, a fuel injection valve, a combustion engine, an exhaust manifold and a catalystic converter for converting heat energy generated by fuel combustion into mechanical energy, the apparatus further comprising a control device including a fuel injection valve for controlling the fuel supply rate, an ignition system for controlling the timing of igniting the fuel-air mixture gas in the combustion engine, and an exhaust gas recirculation valve for controlling the recirculation of part of the exhaust gas in said exhaust manifold back to said intake manifold, a first sensor group including a throttle position sensor, an intake manifold pressure sensor and an engine revolution sensor, for detecting the operating conditions of the combustion engine operated for energy conversion; a second sensor group including an air pressure sensor, and intake manifold temperature sensor and a combustion engine cooling water temperature sensor for detecting the ambient conditions of the combustion engine operated for energy conversion; a third sensor for detecting the position of the exhaust gas recirculation valve of the combustion engine operated for energy conversion; a fourth sensor for detecting the combustion pressure of the combustion engine; a memory for storing a setting for controlling said control device, said setting being capable of being updated in response to an input signal to said memory; and a microcomputer for retrieving the value detected by said first sensor group, the value detected by said second sensor group, the value detected by said third sensor, the value detected by said fourth sensor and the setting for controlling said control device, from said first sensor group, said second sensor group, said third sensor, said fourth sensor and said memory, thereby calculating the true air flow rate and fuel flow rate, said microcomputer retrieving from said memory the optimum engine revolutions and optimum intake manifold pressure associated with said true air flow rate and true fuel flow rate, thereby calculating a setting for optimum control of the fuel injection valve in accordance with said retrieved engine revolutions and intake manifold pressure, said microcomputer comparing the value detected by said fourth sensor with the spark timing characteristic stored in said memory, thereby calculating a setting for optimum control of said ignition system, said microcomputer retrieving from said memory the optimum engine revolutions and intake manifold pressure associated with the value detected by said third sensor, thereby calculating a setting for optimum control of said ignition system in accordance with said engine revolutions and said intake manifold pressure, the results of said calculations being applied to said control device; the improvement further comprising:

(a) a sensor for detecting the change with time of the combustion engine;

(b) a modification factor memory circuit for detecting the ratio between a previously detected value and the presently detected value on the basis of the value detected by said sensor for detecting the change with time of the combustion engine, said memory circuit applying said ratio and the calculated value of the modification factor as a new setting to said memory; and (c) a high temperature sensor for detecting the temperature of said catalystic converter, said memory updating the data therein to a new setting in response to a correction input signal received from said modification factor memory circuit, said microcomputer controlling said exhaust gas recirculation valve on the basis of said new setting of said memory and correcting said setting of said memory in response to the output from said high temperature sensor, thereby controlling said fuel injection valve and said ignition system.

13. In an apparatus for the control of a combustion engine with a control device for controlling the process of converting heat energy generated by fuel combustion into mechanical energy, said apparatus comprising a first sensor for detecting the operating conditions of the combustion engine operated for energy conversion, said detected value being converted into an electrical energy and produced from said first sensor; a memory storing a setting for controlling said control device; and a microcomputer for retrieving the value detected by said first sensor and the setting for controlling said control device, from said first sensor and said memory, said microcomputer comparing the value detected by said first sensor with the setting for controlling said control device, thereby calculating a setting for optimum control of said control device in accordance with the operating conditions of said combustion engine, the result of said calculation being applied to said control device; the improvement further comprising:

(a) a sensor for detecting the change with time of the combustion engine; and (b) a modification factor memory circuit for determining the ratio between a previously detected value of said sensor for detecting the change with time of the combustion engine and the presently detected value thereof, thereby calculating a modification factor associated with said ratio, said memory circuit applying to said microcomputer the calculated value of said memory and said modification factor as a new setting.

14. In an apparatus for the control of a combustion engine with a control device for controlling the process of converting heat energy generated by fuel combustion into mechanical energy, said apparatus comprising a first sensor for detecting the operating conditions of the combustion engine operated for energy conversion, said detected value being converted into an electrical signal and produced by said first sensor; a second sensor for detecting the ambient conditions of the combustion engine operated for energy conversion, said detected value being converted into an electrical signal and produced by said second sensor; a memory for storing a setting for controlling said control device; and a microcomputer for retrieving the value detected by said first sensor, the value detected by said second sensor and the setting for controlling said control device, from said first sensor, said second sensor and said memory, said microcomputer comparing the value detected by said first sensor and corrected on the basis of the value detected by said second sensor, with the setting for controlling said control device, thereby calculating a setting for optimum control of said control device in accordance with the operating conditions of the combustion engine, the result of said calculation being applied to said control device; the improvement further comprising:

(a) a sensor for detecting the change with time of the combustion engine; and (b) a modification factor memory circuit for determining the ratio between a previously detected value of said sensor for detecting the change with time of the combustion engine and the presently detected value thereof, said memory circuit calculating a modification factor associated with said ratio from function previously obtained, said memory circuit producing and applying the calculated values of said memory and said modification factor as a new setting to said microcomputer.

* * * * *